United States Patent Office 3,341,615
Patented Sept. 12, 1967

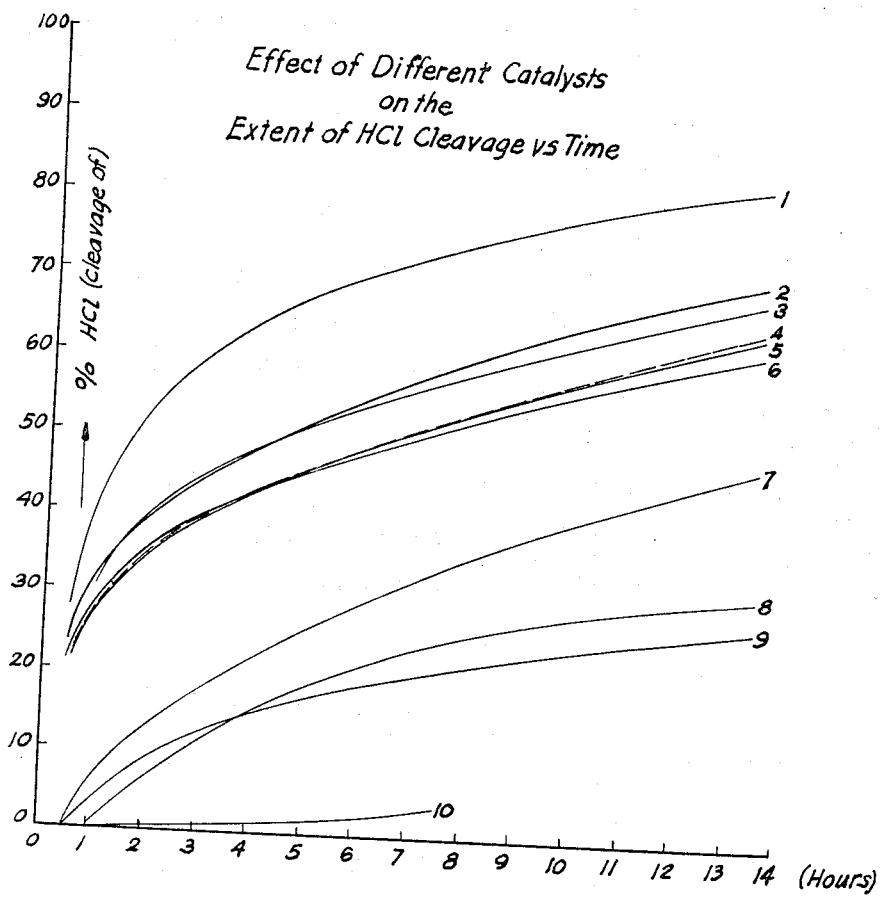

3,341,615
PROCESS FOR THE DEHYDROHALOGENATION OF HALOGENATED HYDROCARBONS
Horst-Dieter Wulf and Werner Schmidt, Marl, Germany, assignors to Chemische Werke Hüls Aktiengesellschaft, Marl, Germany
Filed May 7, 1963, Ser. No. 278,695
Claims priority, application Germany, June 2, 1962, C 27,158
9 Claims. (Cl. 260—677)

This invention relates to the production of olefins by the dehydrohalogenization of halogenated hydrocarbons, and to the use of such olefins for the production of other compounds.

The catalytic splitting of hydrogen halides from halogenated alkanes has been disclosed for a long time in the literature. For this process, various catalysts have been suggested, especially alkalis or alkaline earths which are capable of combining with the liberated hydrogen halides. Among the wide range of proposed catalysts are also to be found metals, neutral salts such as $MgCl_2$ and $BaCl_2$; acidic reagents such as phthalic anhydride, carbazole and N-alkylcarbazole; silicates and aluminum hydrosilicates of synthetic or natural origin such as silica gels, diatomaceous earth, or minerals of the bentonite, zeolith or montmorillonite type; catalysts of more or less the Friedel-Crafts type, such as $SnCl_4$, $FeCl_3$, $ZnCl_2$, up to $AlCl_3$; and even activated carbon. The proposed processes are carried out by heating the halogenated hydrocarbons for a long time with the above identified catalysts and then separating the reaction product from the catalyst by any chemical engineering technique, such as distillation.

As starting materials for the dehydrohalogenation reaction, halogenated paraffinic hydrocarbons and cycloalkanes have been mentioned. Thus, in U.S. Patent 1,995,827, a mixture of paraffin hydrocarbons consisting mainly of dodecane is mentioned, with a chloride content of 7%, corresponding to about 35 mol percent of monochlorination. The chlorinated product is boiled under reflux with 0.5% $FeCl_3$ to convert it into a mixture of olefins and unreacted chlorinated hydrocarbons, which mixture without any separation of its components is condensed with benzene by the action of the $AlCl_3$. According to U.S. Patent 2,708,210, chlorinated paraffinic hydrocarbons are heated several hours to 250° C. with pretreated cracking catalysts of the montmorillonite type so as to split off HCl with the formation of olefins whose iodine numbers indicate 92% of the theoretical yield, and a residual chlorine content up to 0.16%.

Furthermore, in West German Patent 1,026,308, there is described the splitting off of HCl from chlorinated cyclohexane at temperatures between 180° C. and 250° C. by means of aluminum hydrosilicate suspended in motor oil, whereby a mixture of cyclohexene and chlorinated cyclohexane is obtained, which would have to be sent through a second splitting process for the removal of all the HCl.

All of these processes have their disadvantages which render difficult the commercial utilization of the olefin and HCl reaction products without preliminary purification and without the production of undesirable side products. Additionally, in all such processes, the reaction does not run to completion but must be put through another process to complete it.

For the production of detergents consisting of alkylbenzenes which are easily decomposable biologically, the use of olefins with a minimum of branching is of highest importance. It has been found, however, that catalysts of the Friedel-Crafts type and also the silicates and aluminum hydrosilicates exert an isomerizing and cracking action upon halogenated hydrocarbons, so that the resulting olefins, and also the hydrocarbons that are to be recycled, contain a greater proportion of branched chains than the original materials. Furthermore, the use of catalysts of these types also leads to the formation of olefins with double the number of carbon atoms in larger amounts than were present in the original materials.

Furthermore, by partial cracking of the initial hydrocarbons there are also formed gaseous hydrocarbons of low molecular weight such as isobutane which are present as impurities in the hydrogen halides so as to prevent them from being used for industrial syntheses, as for example, the production of vinyl chloride.

In the process of German Patent 10,372, the separation of HCl is accomplished by blowing in superheated steam, which however, leads to serious corrosion problems and requires much of the separated HCl to be collected as aqueous hydrochloric acid, or it may even have to be neutralized with alkaline materials and disposed of as waste.

The principal object of this invention, therefore, is to provide a novel process for the production of olefins, which process to a large extent overcomes the deficiencies of the prior art.

Another object is to provide other processes which utilize these olefins as raw materials or intermediates.

Upon further study of the specification and claims, other objects and advantages of the present invention will become apparent.

It has now been found that olefins can be efficiently produced without isomerization or cracking of the carbon chains by continuously fractionally dsitilling the formed olefin from the reaction mixture at substantially the same rate at which the olefins are formed. The halogenated hydrocarbons are contacted at 150–500° C., preferably 180–350° C., with metals or metal alloys, separately or in mixtures of elements from Groups Ib, IIa and IIb, IIIa, Va, VIa, VIIa, and VIII of the Periodic Table. The gaseous products are then fractionated to separate the unreacted halogenated hydrocarbons which are then recycled to the catalytic reaction chamber.

FIGURE 1 is a graph which shows the rate of hydrohalide separation for various catalysts.

The halogenated hydrocarbons, or mixtures thereof with the unhalogenated hydrocarbons from which they were produced, can be passed into a reaction column filled with packings made of hydrohalide-splitting catalytic metals and heated to reaction temperature. The desired reaction temperature is so chosen that the olefins and higher unsaturated hydrocarbons produced by the splitting of hydrohalides from halogenated hydrocarbons, and possibly together with nonhalogenated paraffinic, cycloparaffinic or alkylaromatic hydrocarbons, and the hydrohalides thus produced, are distilled out of the reaction chamber.

If necessary, the olefins, in admixture with the hydrogen halide and possibly in admixture with saturated hydrocarbons, can be conducted into a fractionating column and are there separated by distillation from the entrained halogenated hydrocarbons which are then returned to the reaction chamber. The pure halogen free olefins are condensed, together with the saturated hydrocarbons that have the same boiling points. A portion of the condensate is refluxed to the fractionating column. The separated hydrohalide is conducted away from the condenser in very pure condition and becomes available for other syntheses.

The fractionating column that is used for separating the olefins from the unreacted halogenated hydrocarbons is preferably mounted on the reaction chamber, but can also be set up as a separate piece of apparatus adjacent to the reaction chamber.

The halogenated hydrocarbons can contain F, Cl, Br, or I, singly or in combination. Suitable halogenated hydrocarbons are the halogenated paraffins, isoparaffins or cycloparaffins with 5 to 20 carbon atoms; alkylaryls which carry the aforesaid halogenated paraffins, halogenated isoparaffins, and halogenated cycloparaffins, singly or in combination, as side chains and which contain about 1 to 3 halogen atoms per molecule. Especially suitable are those halogenated hydrocarbons which contain only one halogen atom per molecule which are obtainable, for example, by halogenation of paraffins, isoparaffins, cycloparaffins, and alkylaryls in the side chains up to a molar conversion of 50%.

By "olefins" is here meant the unsaturated hydrocarbons that are obtained by the removal of hydrogen halides from halogenated hydrocarbons.

The reaction is preferably carried out under pressure with halogenated hydrocarbons whose boiling point is at least 150° C., although it is obviously also possible to effect hydrohalide separation under atmospheric or reduced pressure by heating in the presence of a catalyst.

As catalysts, the metals of Groups Ib, IIa, IIb, IIIa, Va, VIa, VIIa and VIII (Chemiker-Kalender v.H.V.v. Vogel, Springer Verlag 1956, p. 2) of the Periodic Table, as well as their mixtures and alloys are especially suitable. Such metallic catalysts of Groups Ib, IIa, IIb, IIIa, Va, VIa, VIIa and VIII include copper, silver, gold, beryllium, magnesium, zinc, cadmium, mercury, aluminum, gallium, indium, thallium, antimony, bismuth, iron, cobalt, nickel, rubidium, rhodium, palladium, iridium and platinum. Mixtures and alloys of these metals with one another are also suitable. For example, a mixture of nickel and cobalt, or an alloy of copper and nickel work advantageously.

Also suitable are alloys of the foregoing described metals with other elements, for example, iron with carbon.

FIGURE 1 shows the effect of various catalysts when used for the dehydrohalogenation of a chlorinated mass having the following composition. A tetradecane chlorinated to a content of 7% by weight of chlorine.

The reaction temperature was 200° C., atmospheric pressure. The catalysts were sheets of metal 2 x 5 cm. in size, except 8 and 10.

Referring to the specific catalysts, their composition is as follows:

(1) Armco iron=Fe (0.01% C; 0.2% Si; 0.3% Mn)
(2) S₂-iron and copper=50% each
(3) S₂-iron=Fe (0.18% C; 0.15% Si; 0.3% Mn)
(4) V₂A rubbed with emery=17% Cr; 9% Ni; 2% Mn; Fe up to 100%
(5) V₂A polished=17% Cr; 9% Ni; 2% Mn; Fe up to 100%
(6) Ra₄-V4A=16.5% Cr; 10.5% Ni; 2% Mo; 2% Mn; Fe up to 100%
(7) Copper
(8) Cuprous chloride
(9) Nickel
(10) Calcium chloride From the results of FIGURE 1, it is clear that iron and iron alloys yield superior results.

Other than the metal, the catalyst may be comprised of a conventional catalyst carrier such as alumina. For example, platinum on alumina will serve to dehydrohalogenate the chlorinated hydrocarbons.

This invention produces olefins from any halogenated hydrocarbon containing the structure

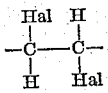

or

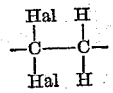

preferably

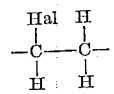

It is seen that the above compounds have halogen attached to other than a tertiary carbon atom.

The olefins and alkylaryl compounds with olefinic side chains, as well as mixtures thereof which are produced by this invention, are especially suitable for use as solvents for synthetic or natural resins. They are also useful as intermediates for the preparation of alkylaryl sulfonates as well as alkyl phenols.

Without further elaboration it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

Into a column of 150 mm. diameter having a stripping zone as HCl splitting section filled with iron Raschig rings of a total surface area of 4.65 m.² and a rectification zone filled with porcelain Raschig rings, there are introduced 620 g./h. monochlorocyclohexane (99.7% pure, with 0.3% cyclohexane) at a point immediately underneath the rectification section. The sump is heated electrically to 202° C. Under a pressure of 2.7 atm. (gage) and a temperature of 133° C. at the head of the column with a reflux ratio of 5:1, 428 g. cyclohexane are distilled over per hour. Gas chromatography shows that it is 99.5% pure, the impurities comprising 0.43% cyclohexane, and a chlorine content of less than 0.01%. The condenser delivered 192 g. HCl per hour with 0.0062% by weight of H₂ and 0.0045% by weight of C₄H₆ as impurities.

*Comparison*

For comparison, in 500 g. motor oil, there were suspended 100 g. of an industrial catalyst "K10" (aluminum hydrosilicate). The mixture was heated to 250° C. in an agitated flask connected to a Raschig column, and within the course of one hour 150 g. monochloro-cyclohexane (99.7% pure, with 0.3% cyclohexane) were introduced by means of a tube into the bottom of the flask. 59 g. of distillate were removed from the head of the Raschig column. The weight of the motor oil was increased about 45 g., due to the formation of substances with higher boiling points than monochloro-cyclohexane. 43 g. HCl were collected in water, and the remaining gas analyzed. The results, in comparison with the results of this invention, are given in the following table:

|  | Percent by Weight | |
| --- | --- | --- |
|  | This Invention using iron | Comparison using "K10" |
| Distillate: |  |  |
| Cyclohexene | 99.5 | 44.1 |
| Cyclohexane | 0.43 |  |
| Preliminary run (5 components) |  | 0.3 |
| Methylcyclopentane |  | 24.3 |
| 1-methylcyclopentene |  | 10.1 |
| Intermediate run (10 components) |  | 0.5 |
| 1-chlor-1-methylcyclopentane |  | 19.5 |
| Monochlorocyclohexane |  | 0.3 |
| Final run (5 components) |  | 0.9 |
| Hydrogen Chloride: |  |  |
| Hydrogen | 0.0062 |  |
| Butene | 0.0045 |  |
| Butane |  | 0.29 |
| HCl | (¹) | (¹) |
| Total Impurities in HCl | 0.0107 | 0.29 |

¹ Remainder to 100%.

EXAMPLE 2

A mixture of paraffinic hydrocarbons whose gas chromatographic analysis gave the following composition:

(Percent by Weight)

| C$_9$ | | C$_{10}$ | | C$_{11}$ | | C$_{12}$ | | Total |
|---|---|---|---|---|---|---|---|---|
| iso- | n- | iso- | n- | iso- | n- | iso- | n- | |
| — | 0.3 | 0.2 | 41.0 | 3.0 | 55.0 | 0.4 | — | 3.6 iso.; 96.3 n-paraffin. | was chlorinated up to a chlorine content of 6.6% by weight, corresponding to a 32.5% molar conversion.

Of this mixture, 2.65 kg. per hour are pumped into a column 150 mm. in diameter consisting of a reaction zone containing iron Raschig rings with a total surface of 4.65 m.$^2$. The evaporator under the oven was heated to 247° C. From the head of the fractionation column mounted on the reaction oven, said column operating at an 8:1 reflux ratio, 2.464 kg. of an olefin-paraffin mixture and 0.179 kg. HCl were drawn off. In the sump of the reaction oven, 0.007 kg. per hour of hydrocarbons with higher boiling points are collected. The olefin-paraffin mixture has a bromine number of 34.5. The olefin production is over 99% of the theoretical. The residual chlorine content of the olefin paraffin mixture amounts to 0.016% Cl.

The drawn off HCl was collected in water and analyzed for impurities. After removal of the entrained C$_{9-12}$ hydrocarbons, the following impurities were found.

Component: Percent by wt.
H$_2$ _____ 0.0023
CH$_4$ _____ 0.0154
C$_2$H$_6$ _____ 0.0148
C$_2$H$_4$ _____ 0.0115
C$_3$H$_8$ _____ 0.0169
C$_3$H$_6$ _____ 0.0103
C$_4$H$_{10}$ _____ 0.0206
C$_4$H$_8$ _____ 0.0077
C$_5$H$_{12}$ _____ 0.0039
C$_5$H$_{10}$ _____ 0.0038

Total impurities _____ 0.1072

The olefin-paraffin mixture was reacted with benzene in the presence of hydrogen fluoride as catalyst for the production of alkyl benzenes, and from the reaction products, the non-olefinic unreacted C$_{10}$ and C$_{11}$ paraffins were isolated. A gas-chromatographic analysis of these residual paraffins gave the following composition:

(Percent by Weight)

| Benzene | C$_9$ | | C$_{10}$ | | C$_{11}$ | | C$_{12}$ | | Total |
|---|---|---|---|---|---|---|---|---|---|
| | iso- | n- | iso- | n- | iso- | n- | iso- | n- | |
| 0.3 | — | 0.3 | 0.4 | 41.0 | 3.0 | 54.0 | 0.4 | — | 3.8 iso.; 95.3 n-paraffin. |

A comparison with the paraffinic mixture to be chlorinated shows that there has not been any appreciable isomerization of the n-paraffins. A gas chromatographic analysis of the C$_{10}$–C$_{11}$ alkylbenzenes leads to the same conclusion.

Comparison

A mixture of C$_{12-13}$ paraffins of the composition indicated in the table below has been chlorinated up to 6.9% by weight of chlorine. In three tests, 300 g. of this partially chlorinated product were agitated with (1) 1.5 g. FeCl$_3$; (2) 30 g. K10; and (3) 30 g. Tonsil (acidic siliceous clay) and heated to 225° C. until no more HCl was separated therefrom. The hydrocarbon mixture was then separated from the catalyst by filtration and then distilled. From each test, higher boiling fractions were obtained as follows: 7 g. with FeCl$_3$; 40 g. with K10; and 46 g. with Tonsil.

For converting the olefins into paraffins, the distillates were hydrogenated by contacting them with Raney nickel and the paraffinic mixture thus produced subjected to gas chromatographic analysis to determine its composition, which was found to be as indicated in the table.

(Percent by Weight)

| | C$_{12}$ | | <C$_{12}$ | | C$_{13}$ | | C$_{14}$ | | Total | |
|---|---|---|---|---|---|---|---|---|---|---|
| | iso- | n- | iso- | n- | iso- | n- | iso- | n- | iso- | n- |
| Initial paraffin | | 0.32 | 0.1 | 39.0 | 4.0 | 57.0 | | | 4.40 | 96.34 |
| FeCl$_3$ | 9.0 | 0.2 | 0.3 | 47.0 | 4.4 | 39.0 | 0.3 | 0.02 | 13.70 | 86.20 |
| K10 | 7.0 | | | 38.0 | 7.0 | 48.0 | 0.1 | | 14.1 | 86 |
| Tonsil | 6.0 | | | 36.0 | 6.0 | 52.0 | 0.3 | | 12.3 | 88 |

With all three catalysts there occurred pronounced isomerization with substantial chain breakage.

EXAMPLE 3

A paraffinic mixture of the composition

| | Percent by weight | |
|---|---|---|
| | Normal | Iso- |
| Decane | 0.1 | |
| Undecane | 0.3 | |
| Dodecane | 35.0 | 0.3 |
| Tridecane | 61.0 | 3.0 |
| Tetradecane | 0.1 | 0.3 |
| Total | 96.5 | 3.6 | is chlorinated up to a chlorine content of 7.07%.

2000 kg. of this chlorinated paraffin is introduced per hour into a reaction oven filled with iron Raschig rings having a total surface of about 4000 m.$^2$. The temperature in the oven is kept at 282° C. by means of a forced circulation reboiler. On this oven there is mounted a fractionation column from the head of which 1838 kg./h. of an olefin-paraffin mixture with a residual chlorine content of 0.007%, as well as 145 kg./h. of HCl were drawn off at 1 atm. (gage) pressure and at a head temperature of 256° C. The bromine number of the olefin-paraffin mixture is 34, corresponding to an olefin yield of 98.6% of the theoretical.

EXAMPLE 4

1500 g. of a mixture of cyclododecane and cyclodecyl bromide which was obtained by brominating cyclododecane to a bromine content of 11.4% bromine by weight, corresponding to 26.9% molar conversion, is heated to boiling under atmospheric pressure in a flask on which is mounted a column filled with iron Raschig rings. 1265 g. of a mixture of cyclododecane and cyclododecane with a bromine number of 23.2 and a residual bromine content of 0.03%, as well as 149 g. HBr, were drawn off over a dephlegmator in the course of 4 hours at 241° C. In the retort there remained a residue of 84 g., of which 28.2% were bromine and which had a bromine number 19.4. The cyclododecene obtained was 90.1% of the theoretical.

The olefins obtained by this process which may be in admixture with hydrocarbons, will readily combine with aromatic hydrocarbons such as benzene, toluene or xylene in the presence of catalysts to form alkylaromatic hydrocarbons. Suitable catalysts for this purpose are those of the Friedel-Crafts type such as $AlCl_3$, $BF_3$, HF, $ZnCl_2$, sulfuric acid, phosphoric acid, and natural or synthetic aluminum hydrosilicates of the bentonite, zeolith or montmorillonite type, singly or in combination. The reaction products of the olefins with the aromatics are solvents and light lubricating oils.

EXAMPLE 5

470 kg. of the resultant olefin mixture from Example 3 are mixed with 700 kg. dry benzene and with a suspension of 11 kg. $AlCl_3$ in 236 kg. benzene at 35° C. in an enamel agitator. While the mixture is being pumped in, 2 kg. of dry HCl is passed into the reaction mixture for activating the same. After agitating the mixture one hour, the agitator is stopped and the reaction solution drawn off from the light brown catalyst mass.

The reaction mixture is washed to the neutral point with dilute NaOH solution and is then fractionated.

After evaporation of the excess benzene, the following fractions are obtained:

Excess paraffin ---------- 291 kg.=0.2% $n$-$C_{11}$; 0.6% $i$-$C_{12}$; 34.0% $n$-$C_{12}$; 3.7% $i$-$C_{13}$; 59.0% $n$-$C_{13}$; 0.4% $C_{14}$; 1.8% benzene.

Alkylbenzene $C_{12-13}$ ------ 208 kg. b.p. 303.5–313.8° C.; $n_D^{20}$=1.4850; $D_{20}$=0.862; Br.No. 0.28.

Residue ------------------ 46 kg.

The olefins produced by this invention, either alone or in admixture with other hydrocarbons, and in the presence of catalysts, can be reacted with phenols such as phenol, cresols and xylenols with the production of alkylphenols. For this purpose the last named catalysts of the Friedel-Crafts type are used. The alkylphenols thus obtained are useful as plasticizers for phenolic resins and also as additives for lacquers.

EXAMPLE 6

45 kg. of the $C_{10-11}$ olefin-paraffin mixture of Example 2 are heated to 160° C. with continual stirring for 8 hours with 18.8 kg. phenol and 3 kg. of "KSF" catalyst (aluminum hydrosilicate of the montmorillonite type). The catalyst is then separated by centrifuging. The reaction mixture is then fractionated to obtain successively decane, unreacted phenol, and undecane. The residue of alkylphenol $C_{10-11}$ is then purified by distillation in a vacuum.

Furthermore, the olefins produced by this process, either alone or in admixture with other hydrocarbons, and in the presence of catalysts, can be reacted with aromatic hydrocarbons such as benzene, toluene or xylene to produce alkylaromatics, which can then be sulfonated with sulfuric acid, oleum or $SO_3$ to produce the desired alkylaryl sulfonic acids.

In this last process, the initial materials may be n-paraffins from about $C_8$ to $C_{20}$, singly or in combination. Especially suitable are the $C_{10-15}$ n-paraffins. This process can also use mixtures which consist mainly of n-paraffins. The n-paraffins which are to be halogenated with either bromine, iodine or fluorine can be produced from any desired fraction from mineral oils of any locality by the urea or thiourea adduction process or by adsorption on molecular sieves, as described in the Belgian Patent 612,036.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed as this invention is:

1. In a process for the production of an olefin from a halogenated hydrocarbon having halogen attached to other than a tertiary carbon atom, which process comprises reacting a raw material comprising said halogenated hydrocarbon at 150–500° C. in contact with an iron catalyst in the form of packing, the improvement which comprises conducting said reacting under conditions of simultaneous fractional distillation, the rate of the fractionally distilling of the olefin from the reaction mixture being substantially the same rate at which the olefin is formed.

2. The process of claim 1 wherein the catalyst is iron in the form of Raschig rings having an analysis of about 0.01% C; 0.2% Si; 0.3% Mn, the rest being Fe.

3. The process of claim 1 wherein the raw material additionally comprises non-halogenated hydrocarbons which serve as a diluent for the halogenated hydrocarbon.

4. The process of claim 1 wherein the halogenated hydrocarbon contains about 1–3 halogen atoms per molecule and is a chlorinated n-paraffin of 5–20 carbon atoms.

5. The process of claim 3 wherein the raw material is chlorinated up to a content corresponding to 50 mol percent monochlorination.

6. The process of claim 1 wherein the process is conducted at 180–350° C.

7. The process of claim 2 wherein the halogenated hydrocarbon contains about 1–3 halogen atoms per molecule and is a chlorinated n-paraffin of 5–20 carbon atoms.

8. The process of claim 2 wherein the process is conducted at 180–350° C.

9. The process of claim 4 wherein the process is conducted at 180–350° C.

References Cited

UNITED STATES PATENTS

| | | | |
|---|---|---|---|
| 2,613,233 | 10/1952 | Blumer | 260—677 |
| 2,739,172 | 3/1956 | Peters | 260—624 |
| 2,761,000 | 8/1956 | Hervert et al. | 260—677 |
| 3,169,987 | 2/1965 | Bloch | 260—624 |

FOREIGN PATENTS 694,488  1/1953  Great Britain.

LEON ZITVER, *Primary Examiner.*

W. B. LONE, *Assistant Examiner.*